United States Patent
Chang et al.

(10) Patent No.: US 8,264,544 B1
(45) Date of Patent: Sep. 11, 2012

(54) AUTOMATED CONTENT INSERTION INTO VIDEO SCENE

(75) Inventors: Arthur George Chang, Los Altos, CA (US); Schuyler A. Cullen, Mt View, CA (US); Edward R. Ratner, Los Altos, CA (US)

(73) Assignee: Keystream Corporation, Mountain View, CA (US)

( * ) Notice: Subject to any disclaimer, the term of this patent is extended or adjusted under 35 U.S.C. 154(b) by 1316 days.

(21) Appl. No.: 11/982,858

(22) Filed: Nov. 5, 2007

Related U.S. Application Data

(60) Provisional application No. 60/864,299, filed on Nov. 3, 2006.

(51) Int. Cl.
*H04N 5/225* (2006.01)

(52) U.S. Cl. .................. 348/169; 348/173; 725/113

(58) Field of Classification Search .................. 348/169, 348/700; 725/32, 113; 382/173
See application file for complete search history.

(56) References Cited

U.S. PATENT DOCUMENTS

| | | | |
|---|---|---|---|
| 5,600,366 A | | 2/1997 | Schulman |
| 5,812,214 A | | 9/1998 | Miller |
| 6,698,020 B1 | | 2/2004 | Zigmond et al. |
| 6,993,081 B1 | | 1/2006 | Brunheroto et al. |
| 7,342,963 B2 * | | 3/2008 | Laurent-Chatenet et al. ........... 375/240.16 |
| 2002/0030739 A1 * | | 3/2002 | Nagaya et al. ........... 348/143 |
| 2002/0044683 A1 * | | 4/2002 | Deshpande et al. ........ 382/165 |
| 2002/0094189 A1 | | 7/2002 | Navab et al. |
| 2003/0018968 A1 | | 1/2003 | Avnet |
| 2005/0275723 A1 * | | 12/2005 | Sablak et al. ........... 348/169 |
| 2005/0283793 A1 * | | 12/2005 | Chiu ................ 725/19 |
| 2006/0026628 A1 * | | 2/2006 | Wan et al. ............. 725/32 |
| 2006/0075449 A1 | | 4/2006 | Jagadeesan et al. |
| 2006/0245618 A1 * | | 11/2006 | Boregowda et al. ...... 382/107 |
| 2007/0136742 A1 | | 6/2007 | Sparrell |
| 2008/0100709 A1 * | | 5/2008 | Furukawa ............ 348/169 |
| 2008/0187219 A1 * | | 8/2008 | Chen et al. .......... 382/173 |

* cited by examiner

*Primary Examiner* — Abdullahi Salad
(74) *Attorney, Agent, or Firm* — Okamoto & Benedicto LLP

(57) ABSTRACT

A method for automated content insertion into a video sequence. The video sequence comprising a sequence of frames is received. An automated determination is made of non-moving pixels in the sequence of frames. Thereafter, an automated identification is made of valid regions comprising the non-moving pixels which are suitable for unobtrusive content insertion. Other embodiments, aspects and features are also disclosed.

17 Claims, 12 Drawing Sheets

502

512

AUTOMATED CONTENT INSERTION INTO VIDEO SCENE

CROSS-REFERENCE TO RELATED APPLICATIONS

The present application claims the benefit of U.S. Provisional Patent Application No. 60/864,299, entitled "Apparatus and Method for Content Insertion into a Video Stream," filed Nov. 3, 2006, by inventors Arthur Chang, Schuyler A. Cullen, and Edward Ratner, the disclosure of which is hereby incorporated by reference.

BACKGROUND

1. Field of the Invention

The present application relates generally to digital video processing and more particularly to automated content insertion into a video stream.

2. Description of the Background Art

Video has become ubiquitous on the Web. Millions of people watch video clips everyday. The content varies from short amateur video clips about 20 to 30 seconds in length to premium content that can be as long as several hours. With broadband infrastructure becoming well established, video viewing over the Internet will increase.

DETAILED DESCRIPTION

Unlike the hyperlinked static Web pages that a user can interact with—video watching on the Internet is, today, a passive activity. Viewers still watch video streams from beginning to end much like they do with television. With static Web pages, on the other hand, users often search for text of interest to them and then go directly to that section of the Web page.

Applicants have determined that, although it is technologically challenging, it would be highly desirable to be able to modify the content of the video available on the Web. In particular, it would be highly desirable to have the capability to insert content (images, text, or video) into a video stream based on temporal information (i.e. at select times within the video) and based on certain characteristics of the "non-moving" portions of the video (i.e. the "background").

As disclosed herein, it is preferable that the inserted content does not disrupt the video content in any significant way. Hence, the content is preferably inserted into a quiescent part of a video scene. The quiescent part of a video scene has no moving objects of significance. Content insertion into a quiescent area is preferable because covering moving objects generally impacts or disturbs a video scene.

Figure 1:
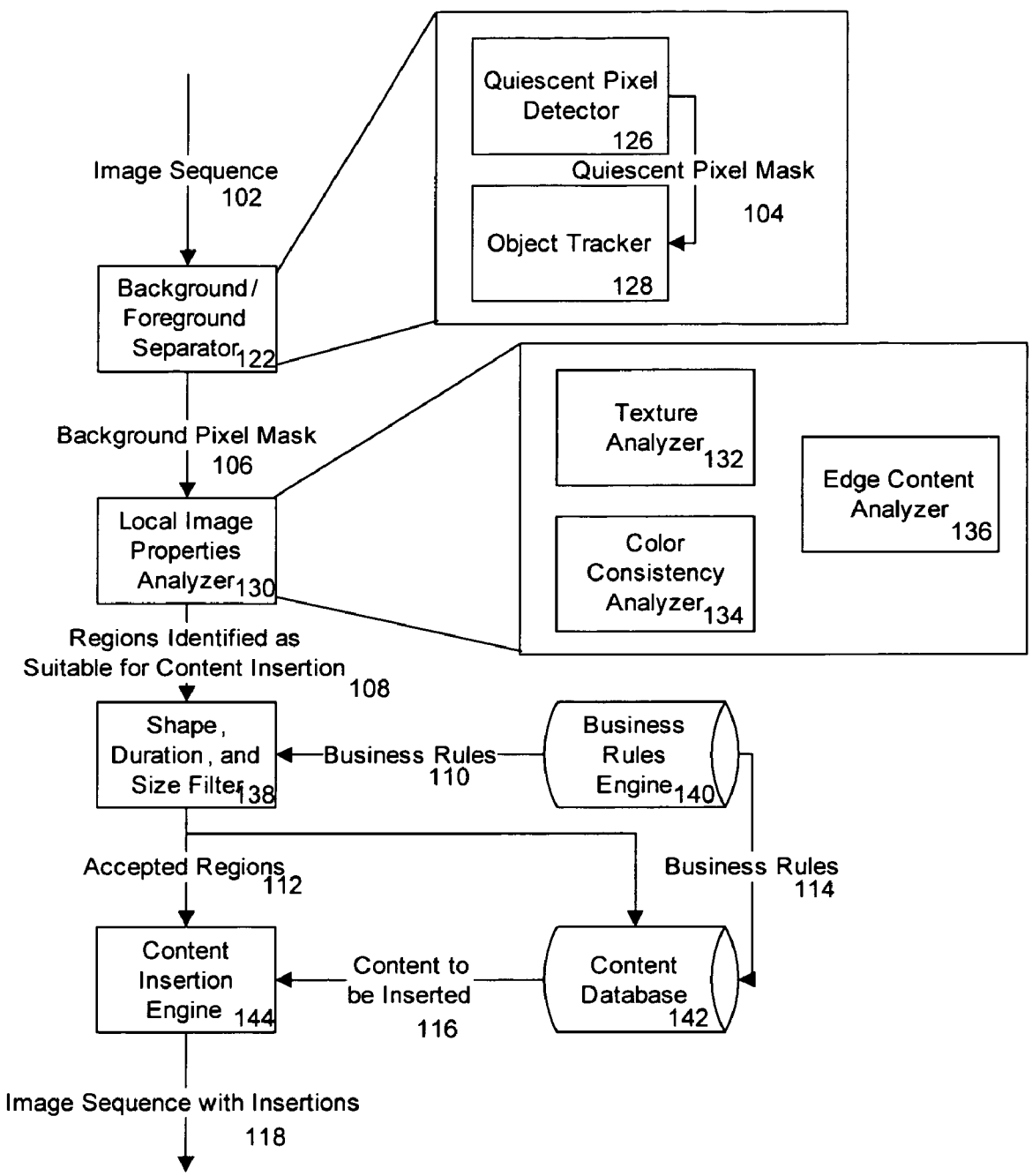
FIG. 1 is a schematic diagram depicting a method using software or hardware circuit modules for automated content insertion into a video stream in accordance with an embodiment of the invention.
Figure 2A:
FIGS. 2A through 2E show five frames in an example video sequence.
Figure 2D:
Figure 2B:
Figure 2E:
Figure 2C:
Figure 3A:
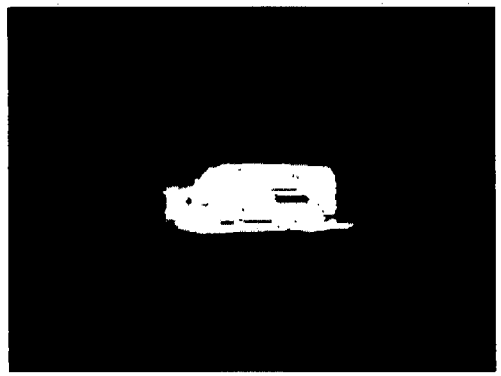
FIGS. 3A through 3E are pixel masks showing a tracked moving object (a van) from the example video sequence.
Figure 3B:
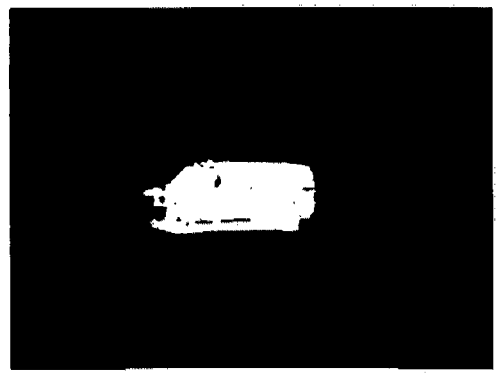
Figure 3C:
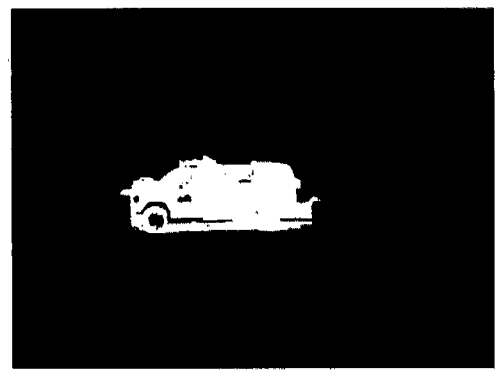
Figure 3D:
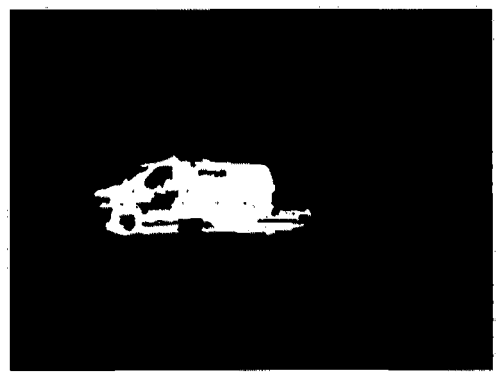
Figure 3E:
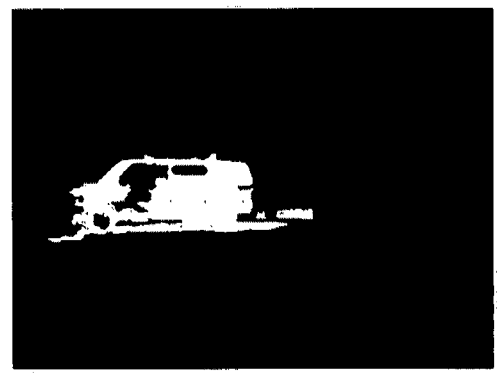
Figure 4A:
FIGS. 4A through 4E are pixel masks showing valid candidate areas for content insertion in the example video sequence.
Figure 4D:
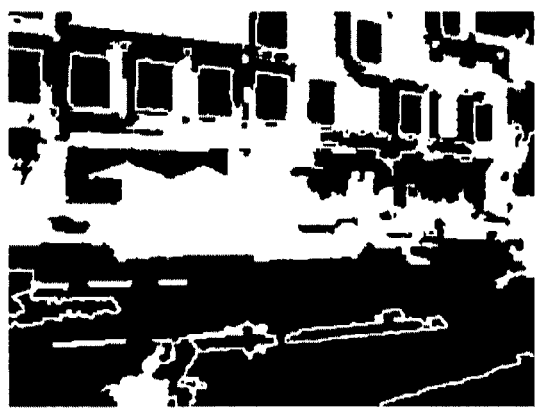
Figure 4B:
Figure 4E:
Figure 4C:

FIG. 1 is a schematic diagram depicting a method using software or hardware circuit modules for automated content insertion into a video stream in accordance with an embodiment of the invention. As seen in FIG. 1, an image sequence (a series of video frames) 102 for a scene may be input into a background/foreground separator module 122.

The background/foreground separator module 122 may be configured to output a background pixel mask 106 for each frame. The background/foreground separator module 122 may include a quiescent pixel detector 126 and an object tracker 128. The background pixel mask 106 identifies moving pixels and non-moving (i.e. background) pixels.

The quiescent pixel detector 126 may be configured to detect pixels that do not change strongly in color space from frame to frame in the video sequence. Such "non-quiescent" pixels (that change strongly in color space from frame to frame) may be eliminated as candidate locations for content insertion. In one embodiment, the pixels whose values are more than a standard deviation away from the mean of the previous N frames are eliminated (as changing too strongly in color space). N may be set to 5, for example. Other numbers of frames will also work for N. Quiescent pixel masks 104 which identify quiescent pixels (not changing too strongly in color space) and non-quiescent pixels (changing too strongly in color space) may be output by the quiescent pixel detector 126.

The object tracker 128 may be configured to use the quiescent pixel masks 104 in addition to the image sequence data 102 in determining coherent moving objects in the video sequence. In one embodiment, the object tracker 128 may use particle filter tracking to track moving objects. In another embodiment, the object tracker 128 may use optical pixel flow analysis to track moving objects. In yet another embodiment, the object tracker 128 may use an exemplary technique for object tracking which partitions a temporal graph as discussed below in relation to FIGS. 7-12. Other techniques for object tracking may also be used. The object tracker 128 determines pixels belonging to moving objects in the video sequence. Hence, those pixels that are not part of a moving object (i.e. non-moving or "background" pixels) are also determined. Background pixel masks 106 which identify moving and non-moving pixels may be output.

For purposes of illustration, consider the example video sequence of five frames shown in FIGS. 2A, 2B, 2C, 2D and 2E. FIGS. 3A, 3B, 3C, 3D and 3E show example pixel masks of a moving object (the van) as tracked through the five frames. The area away from (i.e. the pixels which are not part of) the moving object is shown in black, while the pixels associated with the moving object are shown in white. The background pixel masks 106 would also identify those pixels belonging to other moving objects, besides the example van object, in the images.

The background pixel masks 106, along with the image sequence pixel data 102, may be input into a local image properties analyzer 130. The local image properties analyzer 130 determines contiguous areas that satisfy uniformity criteria. More particularly, the local image properties analyzer 130 preferably determines regions in each image frame which are relatively homogeneous in terms, for example, of texture, color consistency, and edge content. Hence, the local image properties analyzer 130 may include a texture analyzer 132 to determine local texture homogeneity in image segments, a color consistency analyzer 134 to determine local color consistency in image segments, and an edge content analyzer 136 to determine the edge strengths in image segments. Other characteristics which may be considered may include, for example, the size of a consistently textured area, and a length of time a textured area is visible.

In accordance with one embodiment, the local characteristics are computed on connected groups of segments by way of a depth first search across segment neighbors. An area including a connected group of segments may be considered as a region suitable for insertion if the variation in the local characteristics is below the requisite thresholds.

In one embodiment, pairs of neighboring candidate segments are analyzed for possibly being joined or connected together. They are joined together into a single candidate area if the following conditions are satisfied.

Their average colors are similar. Meaning that:

$$\sqrt{(R_1-R_2)+(G_1-G_2)+(B_1-B_2)} < \epsilon_1$$

Where R, G, B refer to the average colors of the each segment (segment 1 and segment 2), and $\epsilon_1$ represents a first threshold.

The segment textures also have to be similar. We define the texture of a segment as the standard deviation of the color values of the segment around their average. Meaning that:

$$\sqrt{(\sigma_{R_1}-\sigma_{R_2})+(\sigma_{G_1}-\sigma_{G_2})+(\sigma_{B_1}-\sigma_{B_2})} < \epsilon_2$$

Where $\sigma$ represents the standard deviation, and $\epsilon_2$ represents a second threshold. In addition, the overall texture of the combined region has to be below a maximum texture threshold:

$$\sigma_{Tot} < \epsilon_3$$

Where $\sigma_{Tot}$ represents the standard deviation of the combined region, and $\epsilon_3$ represents a third threshold.

The edge strength between the segments is below a threshold. We define the edge strength between segments as the sum of the color gradient magnitudes on the border pixels between segments. Meaning:

$$Edge_{12} < \epsilon_4$$

Where $Edge_{12}$ represents the edge strength between segments 1 and 2, and $\epsilon_4$ represents a fourth threshold.

When all these conditions are met the two candidate segments are joined. The process continues until no other segments can be joined. The combined areas have to exceed a minimum size to be considered valid areas.

For instance, for the five frames of the example video sequence, regions 108 (after said joining) identified as suitable for content insertion are shown by the pixel masks in FIGS. 4A, 4B, 4C, 4D and 4E. In these figures, the valid regions identified as suitable for content insertion are shown in black, while the invalid regions (which are unsuitable for content insertion) are shown in white.

The valid regions 108 identified as suitable for content insertion may be input into a shape, duration and size filter 138. For example, the filter 138 may be configured to analyze the candidate areas (valid regions 108) to determine those areas that persist longer than a given minimum number of frames (filtering out those areas that do not persist for sufficiently long durations). Also, the areas may be filtered based on the suitability of their shapes and sizes. The criteria for filtering may be determined, for example, by a set of business rules 110 which may be received, for example, from a business rules engine 140.

Accepted regions 112 passing the filtering may be input into a content insertion system including a content database 142 and a content insertion engine 144. The content insertion system may analyze the accepted regions 112 with regard to a second set of business rules 114 to determine which content is to be inserted into which region.

In one embodiment, the business rules for a particular insertion may include the necessary size of the available insertion area, and the duration and frequency with which a particular piece of content is to be used for insertion. In a specific example, if a valid area for insertion lasts at least ten seconds and is large enough to contain an advertisement (text, image, or video) under consideration, then the advertisement may be retrieved from the content database 142 and inserted by the content insertion engine 144 into the image sequence. The content insertion may be performed by either replacement or by an alpha-blend or other blending with the images. The image sequence with insertions 118 is then output.

Figure 5A:
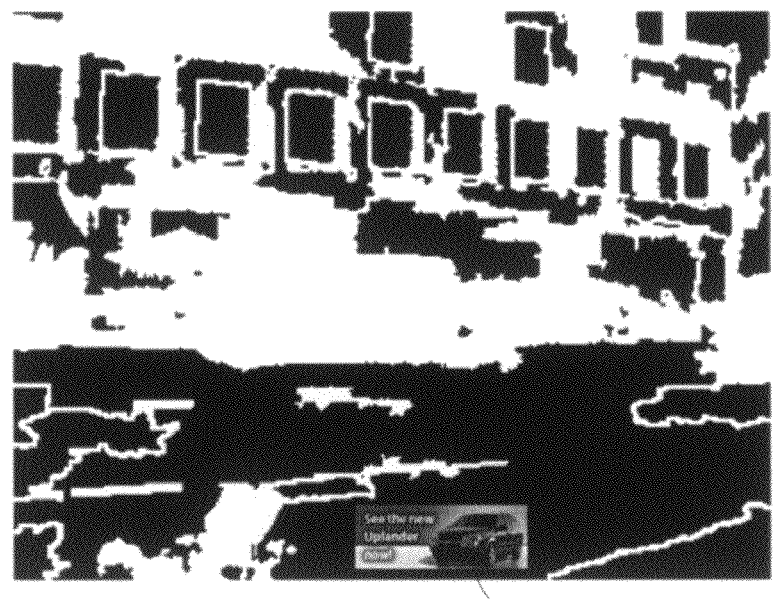
FIGS. 5A and 5B show an illustrative insertion into a persistent valid area.
Figure 5B:

FIGS. 5A and 5B show an illustrative insertion into a persistent valid area. As shown, an example advertisement image in inserted unobtrusively onto a persistent valid area in the example image sequence. FIG. 5A shows the valid and invalid regions with the image inserted into a persistently valid region which is large enough to accommodate the image. FIG. 5B shows the video frame with inserted content that is output.

Advantageously, the technique disclosed herein allows content, such as advertising, to be inserted unobtrusively into video in an automated way that does not depend on a human to manually determine the region for insertion.

Figure 6:
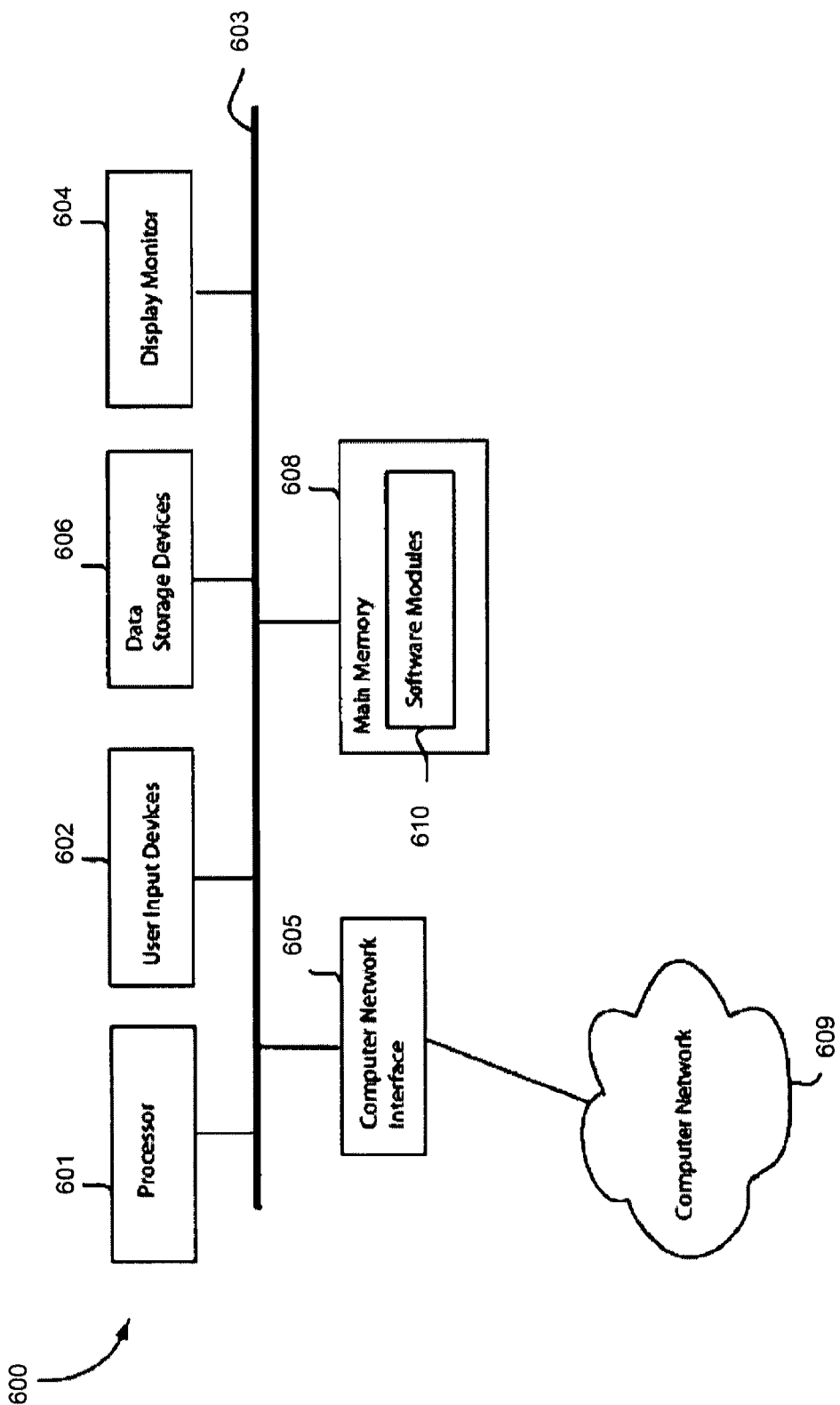
FIG. 6 is a schematic diagram of an example computer system or apparatus which may be used to execute the automated procedures in accordance with an embodiment of the invention.

FIG. 6 is a schematic diagram of an example computer system or apparatus 600 which may be used to execute the automated procedures for automated content insertion in accordance with an embodiment of the invention. The computer 600 may have less or more components than illustrated. The computer 600 may include a processor 601, such as those from the Intel Corporation or Advanced Micro Devices, for example. The computer 600 may have one or more buses 603 coupling its various components. The computer 600 may include one or more user input devices 602 (e.g., keyboard, mouse), one or more data storage devices 606 (e.g., hard drive, optical disk, USB memory), a display monitor 604 (e.g., LCD, flat panel monitor, CRT), a computer network interface 605 (e.g., network adapter, modem), and a main memory 608 (e.g., RAM).

In the example of FIG. 6, the main memory 608 includes software modules 610, which may be software components to perform the above-discussed computer-implemented procedures. The software modules 610 may be loaded from the data storage device 606 to the main memory 608 for execution by the processor 601. The computer network interface 605 may be coupled to a computer network 609, which in this example includes the Internet.

Figure 7:
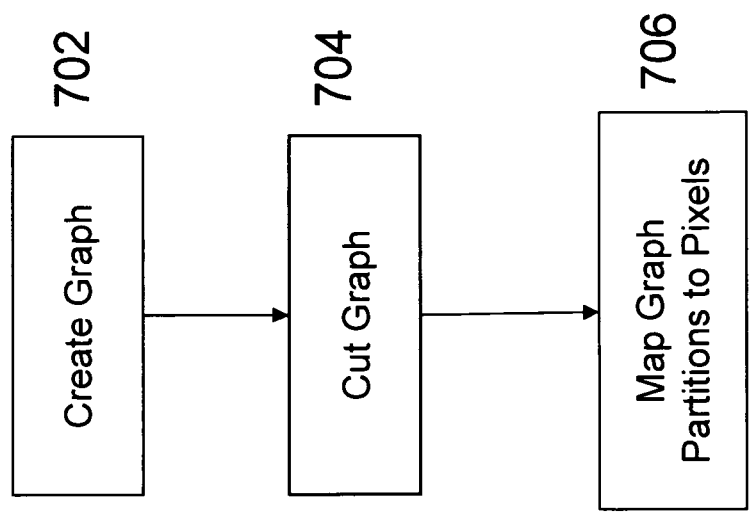
FIG. 7 is a flowchart of a method of object creation by partitioning of a temporal graph in accordance with an embodiment of the invention.

An exemplary technique for object tracking is now discussed in relation to FIGS. 7 through 12. FIG. 7 depicts a high-level flow chart of an object creation or tracking method which may be utilized by the object tracking module (object tracker) 128 in accordance with an embodiment of the invention. Other techniques for tracking a coherently moving object may be utilized in other embodiments.

In a first phase, shown in block 702 of FIG. 7, a temporal graph is created. Example steps for the first phase are described below in relation to FIG. 8. In a second phase, shown in block 704, the graph is cut. Example steps for the second phase are described below in relation to FIG. 9. Finally, in a third phase, shown in block 706, the graph partitions are mapped to pixels. Example steps for the third phase are described below in relation to FIG. 11.

Figure 8:
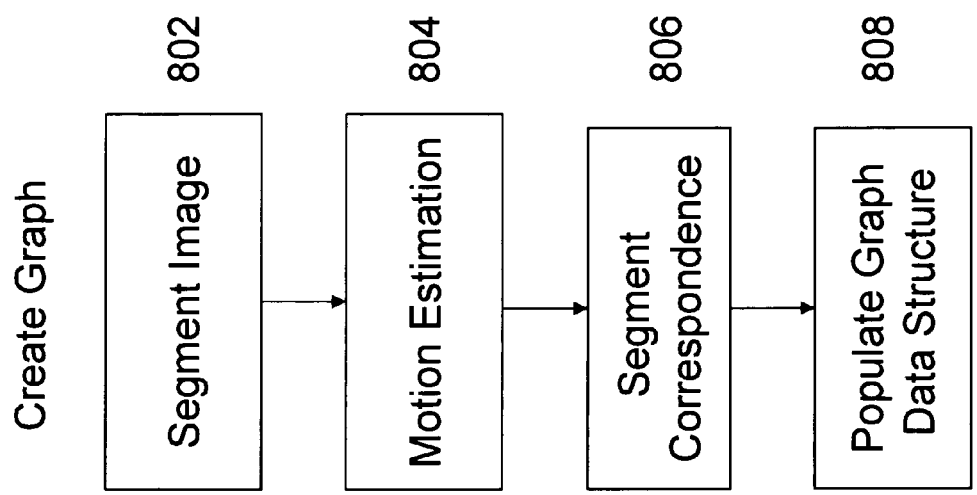
FIG. 8 is a flowchart of a method of creating a graph in accordance with an embodiment of the invention.

FIG. 8 is a flowchart of a method of creating a temporal graph in accordance with an embodiment of the invention. Per block 802 of FIG. 8, a given static image is segmented to create image segments. Each segment in the image is a region of pixels that share similar characteristics of color, texture, and possible other features. Segmentation methods include the watershed method, histogram grouping and edge detection in combination with techniques to form closed contours from the edges.

Per block 804, given a segmentation of a static image, the motion vectors for each segment are computed. The motion vectors are computed with respect to displacement in a future frame/frames or past frame/frames. The displacement is computed by minimizing an error metric with respect to the displacement of the current frame segment onto the target frame. One example of an error metric is the sum of absolute differences. Thus, one example of computing a motion vector for a segment would be to minimize the sum of absolute difference of each pixel of the segment with respect to pixels of the target frame as a function of the segment displacement.

Per block 806, segment correspondence is performed. In other words, links between segments in two frames are created. For instance, a segment (A) in frame 1 is linked to a segment (B) in frame 2 if segment A, when motion compensated by its motion vector, overlaps with segment B. The strength of the link is preferably given by some combination of properties of Segment A and Segment B. For instance, the amount of overlap between motion-compensated Segment A and Segment B may be used to determine the strength of the link, where the motion-compensated Segment A refers to Segment A as translated by a motion vector to compensate for motion from frame 1 to frame 2. Alternatively, the overlap of the motion-compensated Segment B and Segment A may be used to determine the strength of the link, where the motion-compensated Segment B refers to Segment B as translated by a motion vector to compensate for motion from frame 2 to frame 1. Or a combination (for example, an average or other mathematical combination) of these two may be used to determine the strength of the link.

Finally, per block 808, a graph data structure is populated so as to construct a temporal graph for N frames. In the temporal graph, each segment forms a node in the temporal graph, and each link determined per block 806 forms a weighted edge between the corresponding nodes.

Once the temporal graph is constructed as discussed above, the graph may be partitioned as discussed below. The number of frames used to construct the temporal graph may vary from as few as two frames to hundreds of frames. The choice of the number of frames used preferably depends on the specific demands of the application.

Figure 9:
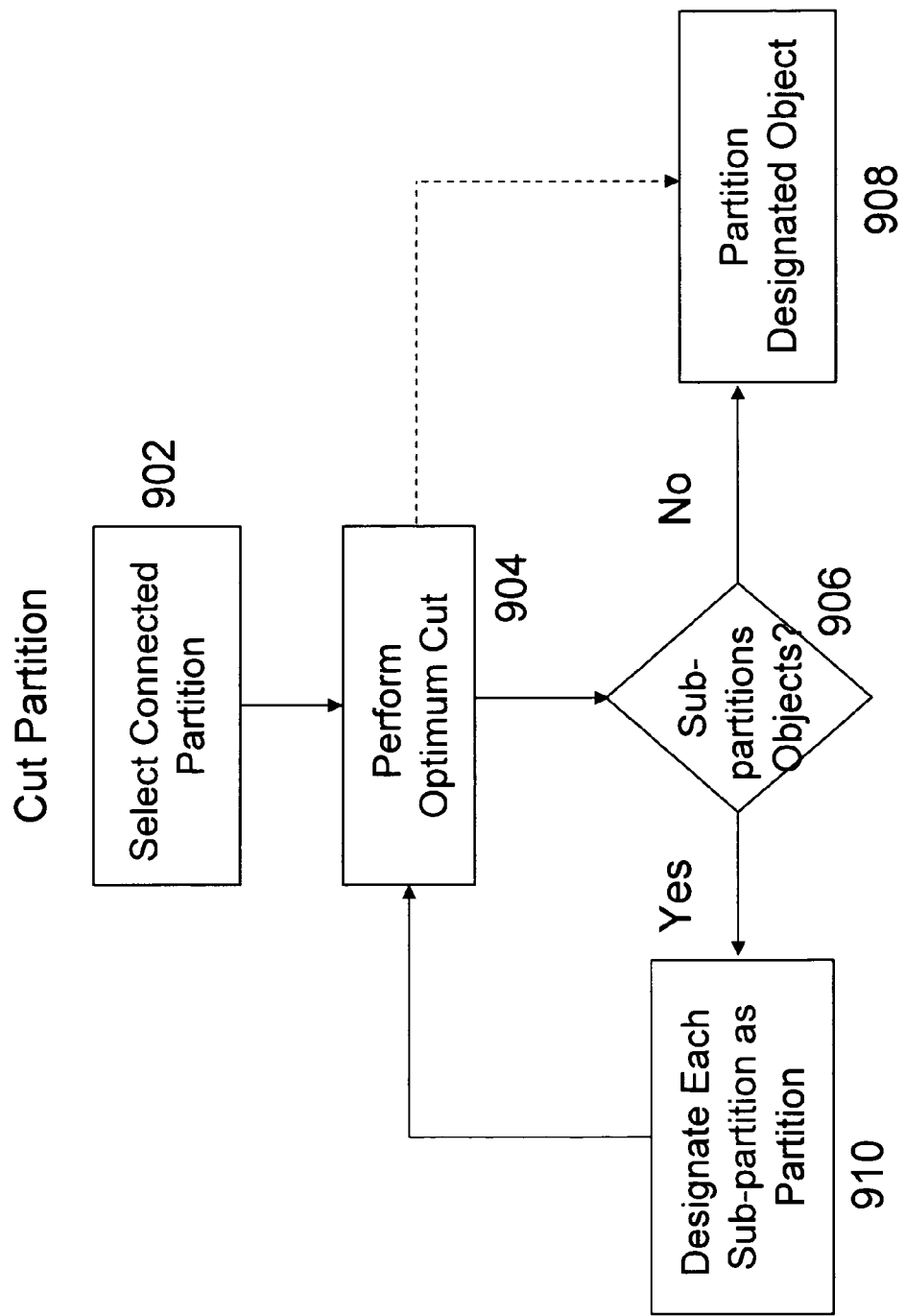
FIG. 9 is a flowchart of a method of cutting a partition in accordance with an embodiment of the invention.

FIG. 9 is a flowchart of a method of cutting a partition in the temporal graph in accordance with an embodiment of the invention. Partitioning a graph results in the creation of sub-graphs. Sub-graphs may be further partitioned.

In a preferred embodiment, the partitioning may use a procedure that minimizes a connectivity metric. A connectivity metric of a graph may be defined as the sum of all edges in a graph. A number of methods are available for minimizing a connectivity metric on a graph for partitioning, such as the "min cut" method.

After partitioning the original temporal graph, the partitioning may be applied to each sub-graph of the temporal graph. The process may be repeated until each sub-graph meets some predefined minimal connectivity criterion or satisfies some other statically-defined criterion. When the criterion (or criteria) is met, then the process stops.

In the illustrative procedure depicted in FIG. 9, a connected partition is selected 902. An optimum or near optimum cut of the partition to create sub-graphs may then be performed per block 904, and information about the partitioning is then passed to a partition designated object (per the dashed line between blocks 904 and 908). An example procedure for performing an optimum or near optimum cut is further described below in relation to FIG. 10.

Per block 906, a determination may be made as to whether any of the sub-partitions (sub-graphs) have multiple objects and so require further partitioning. In other words, a determination may be made as to whether the sub-partitions do not yet meet the statically-defined criterion. If further partitioning is required (statically-defined criterion not yet met), then each such sub-partition is designated as a partition per block 910, and the process loops back to block 904 so as to perform optimum cuts on these partitions. If further partitioning is not required (statically-defined criterion met), then a partition designated object has been created per block 908.

At the conclusion of this method, each sub-graph results in a collection of segments on each frame corresponding to a coherently moving object. Such a collection of segments, on each frame, form outlines of coherently moving objects that may be advantageously utilized to create hyperlinks, or to perform further operations with the defined objects, such as recognition and/or classification. Due to this novel technique, each object as defined will be well separated from the background and from other objects around it, even if they are highly overlapped and the scene contains many moving objects.

Figure 10:
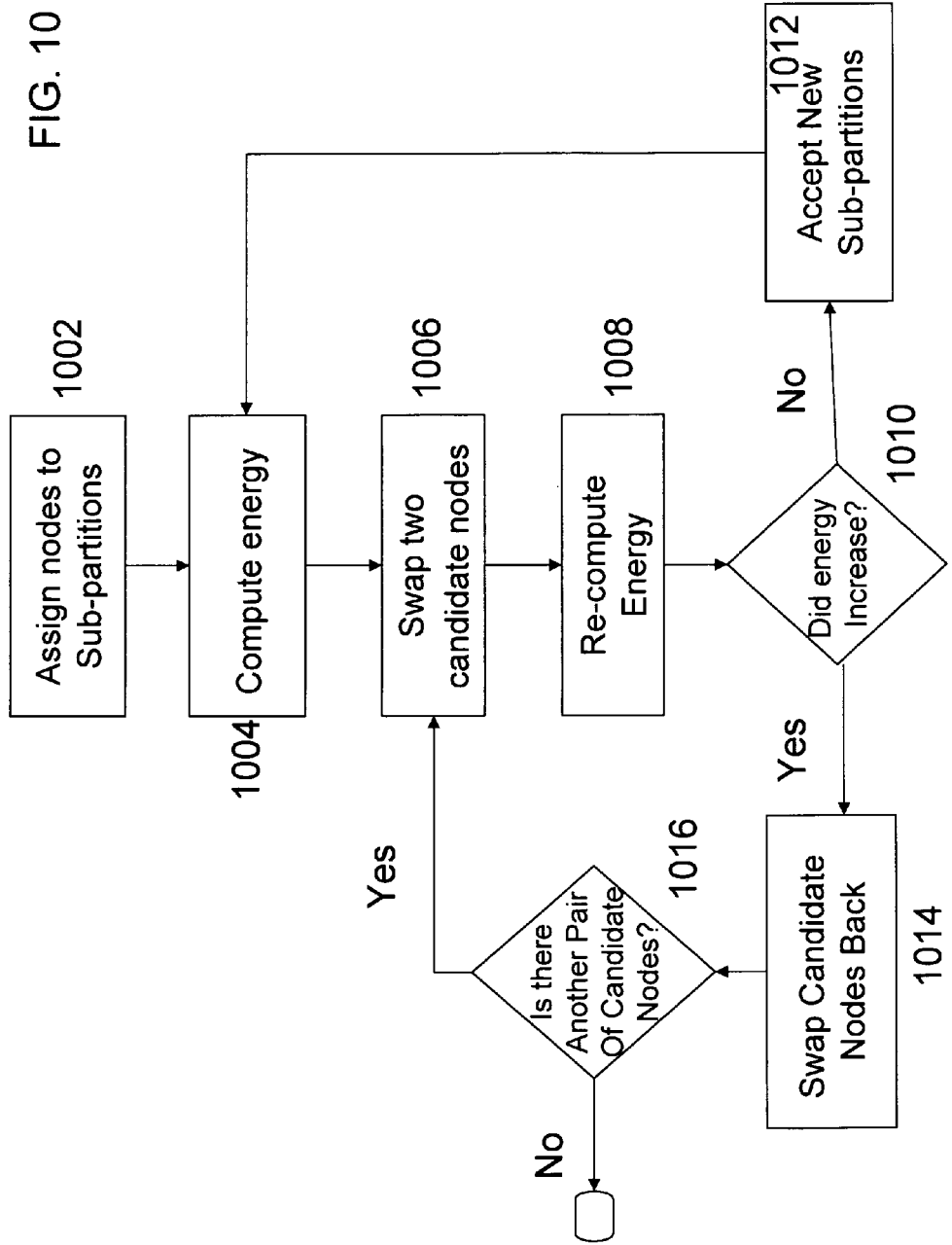
FIG. 10 is a flowchart of a method of performing an optimum or near optimum cut in accordance with an embodiment of the invention.

FIG. 10 is a flowchart of a method of performing an optimum or near optimum cut in accordance with an embodiment of the invention. First, nodes are assigned to sub-partitions per block 1002, and an energy is computed per block 1004.

As shown in block 1006, two candidate nodes may then be swapped. Thereafter, the energy is re-computed per block 1008. Per block 1010, a determination may then be made as to whether the energy increased (or decreased) as a result of the swap.

If the energy decreased as a result of the swap, then the swap did improve the partitioning, so the new sub-partitions are accepted per block 1012. Thereafter, the method may loop back to step 1004.

On the other hand, if the energy increased as a result of the swap, then the swap did not improve the partitioning, so the candidate nodes are swapped back (i.e. the swap is reversed) per block 1014. Then, per block 1016, a determination may be made as to whether there is another pair of candidate nodes. If there is another pair of candidate nodes, then the method may loop back to block 1006 where these two nodes are swapped. If there is no other pair of candidate nodes, then this method may end with the optimum or near optimum cut having been determined.

Figure 11:
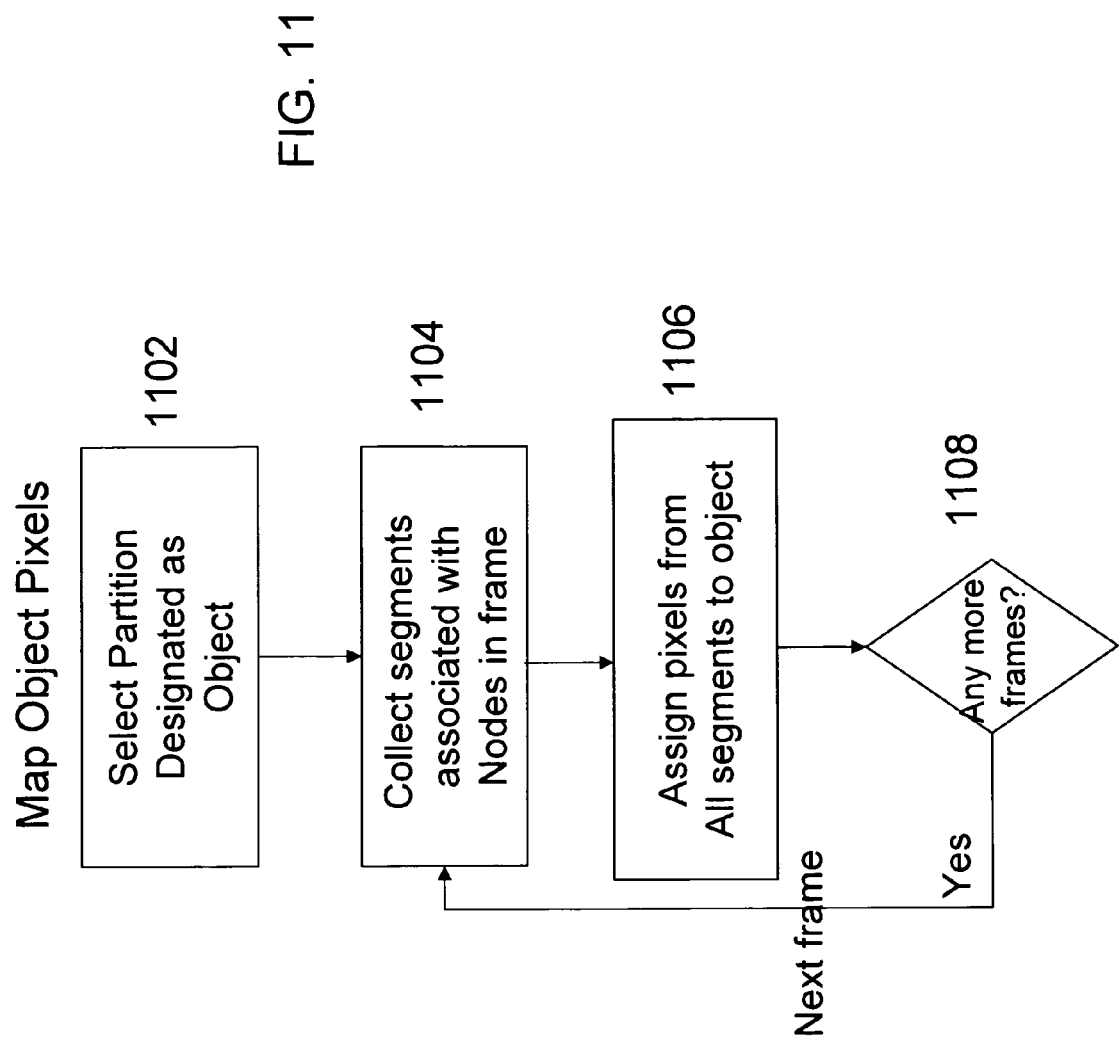
FIG. 11 is a flowchart of a method of mapping object pixels in accordance with an embodiment of the invention.

FIG. 11 is a flowchart of a method of mapping object pixels in accordance with an embodiment of the invention. This method may be performed after the above-discussed partitioning procedure of FIG. 9.

In block 1102, selection is made of a partition designated as an object. Then, for each frame, segments associated with nodes of the partition are collected per block 1104. Per block 1106, pixels from all of the collected segments are then assigned to the object. Per block 1108, this is performed for each frame until there are no more frames.

Figure 12:
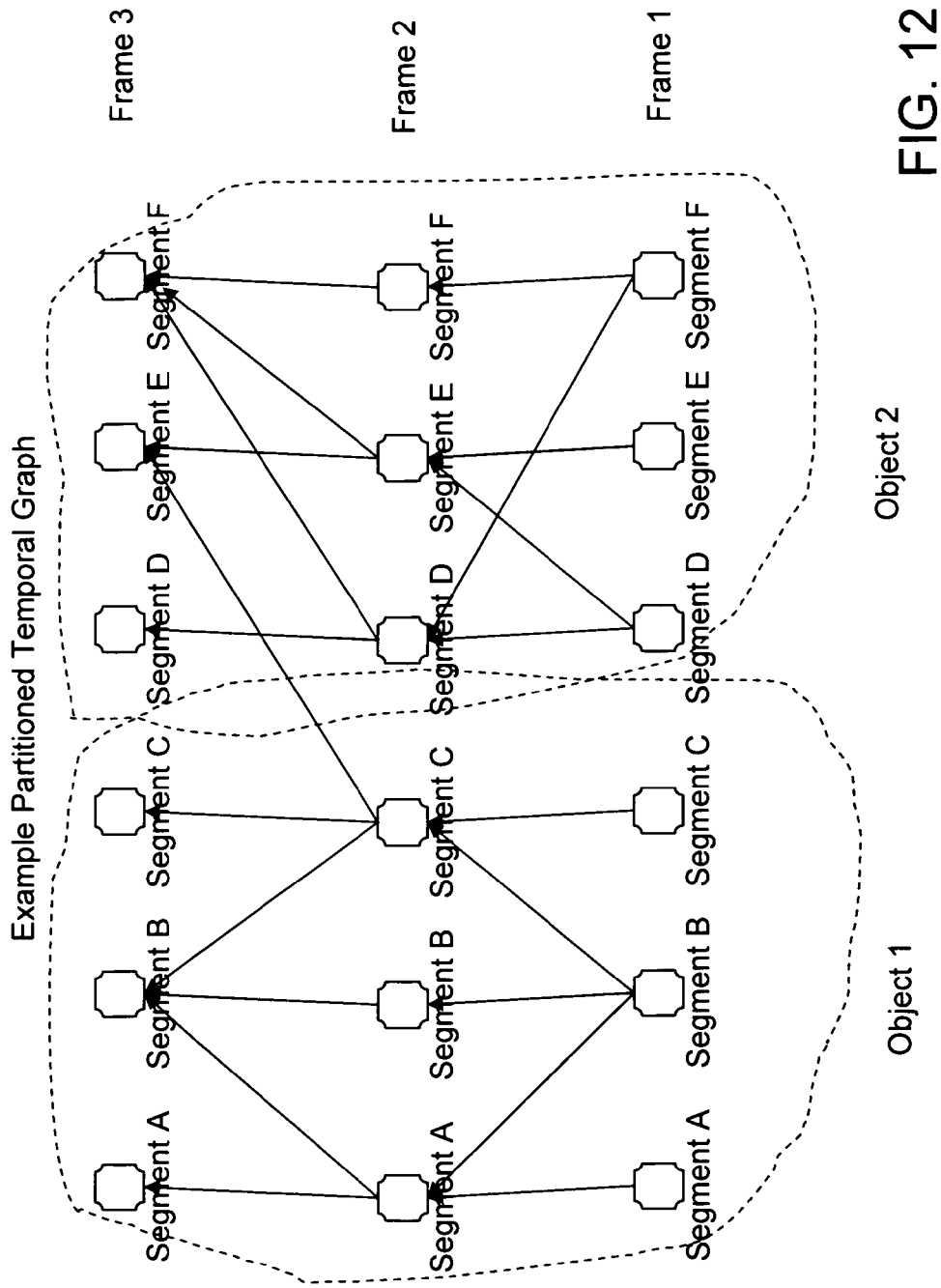
FIG. 12 is a schematic diagram showing an example partitioned temporal graph for illustrative purposes in accordance with an embodiment of the invention.

FIG. 12 is a schematic diagram showing an example partitioned temporal graph for illustrative purposes in accordance with an embodiment of the invention. This illustrative example depicts a temporal graph for six segments (Segments A through F) over three frames (Frames 1 through 3). The above-discussed links or edges between the segments are shown. Also depicted is illustrative partitioning of the temporal graph which creates two objects (Objects 1 and 2). As seen, in this example, the partitioning is such that Segments A, B, and C are partitioned to create Object 1, and Segments D, E and F are partitioned to create Object 2.

The methods disclosed herein are not inherently related to any particular computer or other apparatus. Various general-purpose systems may be used with programs in accordance with the teachings herein, or it may prove convenient to construct more specialized apparatus to perform the required method steps. In addition, the methods disclosed herein are not described with reference to any particular programming language. It will be appreciated that a variety of programming languages may be used to implement the teachings of the invention as described herein.

The apparatus to perform the methods disclosed herein may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus or other data communications system.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for automated content insertion into a video sequence, the method comprising:

receiving the video sequence comprising a sequence of frames;

automated determination of non-moving pixels in the sequence of frames by eliminating pixels whose values are more than a standard deviation away from a mean computed over a previous several frames so as to generate a background pixel mask which identifies the non-moving pixels; and automated identification of valid regions comprising the non-moving pixels which are suitable for unobtrusive content insertion, wherein the automated determination of the non-moving pixels comprises tracking moving objects in the sequence of frames and eliminating pixels belonging to the moving objects from the background pixel mask.

2. The method of claim 1, the automated identification of the valid regions comprises determining contiguous areas that satisfy uniformity criteria.

3. The method of claim 2, wherein the uniformity criteria include a criterion based on homogeneity of texture.

4. The method of claim 2, wherein the uniformity criteria include a criterion based on color consistency.

5. The method of claim 2, wherein the uniformity criteria include a criterion based on edge strength consistency.

6. The method of claim 1, further comprising filtering the valid regions by size with input from a set of business rules.

7. The method of claim 1, further comprising filtering the valid regions by shape with input from a set of business rules.

8. The method of claim 1, further comprising filtering the valid regions by duration with input from a set of business rules.

9. The method of claim 1, further comprising selecting a particular content to be inserted into the video sequence from a content database using a set of business rules.

10. The method of claim 1, wherein tracking moving objects comprises mapping partitions of a temporal graph to pixels.

11. An apparatus configured for automated content insertion into a video stream, the apparatus comprising:

a processor for executing computer-readable program code;

memory for storing in an accessible manner computer-readable data;

computer-readable program code configured to receive the video sequence comprising a sequence of frames;

computer-readable program code configured to determine non-moving pixels in the sequence of frames so as to generate a background pixel mask which identifies the non-moving pixels, wherein pixels whose values are more than a standard deviation away from a mean computed over a previous several frames are eliminated in generating the background pixel mask;

computer-readable program code configured to track moving objects in the sequence of frames and eliminate pixels belonging to the moving objects from the background pixel mask; and computer-readable program code configured to identify valid regions comprising the non-moving pixels which are suitable for unobtrusive content insertion.

12. The apparatus of claim 11, further comprising:

computer-readable program code configured to determine contiguous areas that satisfy uniformity criteria.

13. The apparatus of claim 11, further comprising:

computer-readable program code configured to filter the valid regions by size, shape, and duration with input from a set of business rules.

14. The apparatus of claim 12, wherein the uniformity criteria include a criterion based on homogeneity of texture.

15. The apparatus of claim 12, wherein the uniformity criteria include a criterion based on edge strength consistency.

16. The apparatus of claim 11, further comprising:
 computer-readable program code configured to insert a particular content to be into the video sequence is selected from a content database using a set of business rules.

17. The apparatus of claim 11, wherein the computer-readable program code configured to track moving objects comprises computer-readable program code configured to map partitions of a temporal graph to pixels.

* * * * *